(12) United States Patent
Gokan et al.

(10) Patent No.: US 8,336,691 B2
(45) Date of Patent: Dec. 25, 2012

(54) MULTI-PLATE CLUTCH

(75) Inventors: Yoshitsugu Gokan, Wako (JP); Yoshinobu Shiomi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 521 days.

(21) Appl. No.: 12/402,181

(22) Filed: Mar. 11, 2009

(65) Prior Publication Data

US 2009/0321212 A1 Dec. 31, 2009

(30) Foreign Application Priority Data

Jun. 27, 2008 (JP) ................................. 2008-169039

(51) Int. Cl.
*F16D 7/00* (2006.01)
*F16D 23/00* (2006.01)
*F16D 43/20* (2006.01)
*F16D 13/42* (2006.01)

(52) U.S. Cl. .................................... 192/54.5; 192/70.23
(58) Field of Classification Search .................. 192/54.5, 192/70.23

See application file for complete search history.

(56) References Cited

U.S. PATENT DOCUMENTS

| | | | | |
|---|---|---|---|---|
| 4,189,042 A * | 2/1980 | Miller | ........................ | 192/54.4 |
| 5,617,938 A * | 4/1997 | Tsukada et al. | .............. | 192/54.5 |
| 6,328,147 B1 * | 12/2001 | Fujita | ........................ | 192/70.23 |
| 6,378,682 B1 * | 4/2002 | Mohan et al. | .............. | 192/103 F |
| 6,564,917 B2 * | 5/2003 | Katou et al. | .............. | 192/70.14 |
| 7,104,380 B2 * | 9/2006 | Bishop et al. | .............. | 192/85.32 |
| 2008/0029332 A1 * | 2/2008 | Gokan et al. | .................. | 180/383 |

FOREIGN PATENT DOCUMENTS

JP 2008-38954 2/2008

* cited by examiner

*Primary Examiner* — Troy Chambers
*Assistant Examiner* — Michael Gonzalez
(74) *Attorney, Agent, or Firm* — Ditthavong Mori & Steiner, P.C.

(57) ABSTRACT

A multi-plate clutch includes clutch discs which are disposed between a clutch outer and a clutch inner and are movable in an axial direction of the transmission shaft to permit and cut off the transmission of the rotational driving force from a crankshaft to a transmission shaft. A first biasing mechanism is configured to apply a clamping force to the clutch discs. A cam mechanism is configured to adjust the clamping force in accordance with the rotational driving force. A second biasing mechanism is configured to generate a biasing force to separate the clutch discs away from one another and to weaken the clamping force. The cam mechanism is configured to apply to the second biasing mechanism a force against the biasing force generated by the second biasing mechanism in accordance with the rotational driving force.

14 Claims, 11 Drawing Sheets

MULTI-PLATE CLUTCH

CROSS-REFERENCE TO RELATED APPLICATIONS

The present application claims priority under 35 U.S.C. §119 to Japanese Patent Application. No. 2008-169039, filed Jun. 27, 2008. The contents of this application are incorporated herein by reference in their entirety.

BACKGROUND OF THE INVENTION

1. Field of the Invention

The present invention relates to a multi-plate clutch.

2. Discussion of the Background

In an exemplar conventional clutch, the rotational driving force of a crankshaft is transmitted to a transmission shaft by making plural clutch discs clamped with the biasing force of a disc spring so as to be brought into contact with one another. The exemplar conventional clutch is equipped with a cam mechanism to assist the clamping force. When the rotational driving force from the crankshaft increases, the cam mechanism generates a force in such a direction as to clamp the clutch discs together. The force thus generated is added to the clamping force generated by the disc spring, so that the total clamping force acting on the clutch discs is increased (see, Japanese Patent Application Publication No. 2008-38954, for example, FIG. 1 of the Japanese publication).

With the above-mentioned configuration, as the rotational driving force from the crankshaft increases, the clamping force the cam mechanism adds also increases. For this reason, a clamping force that is larger than necessary may be generated in some conditions of the vehicle. In order to secure high stiffness of the component parts of the clutch against such a large clamping force, the clutch mechanism is required to have heavyweight and large size.

SUMMARY OF THE INVENTION

According to one aspect of the present invention, a multi-plate clutch includes a clutch outer, a clutch inner, clutch discs, a first biasing mechanism, a cam mechanism, and a second biasing mechanism. A rotational driving force is configured to be transmitted from a crankshaft to the clutch outer. The clutch inner is disposed inside the clutch outer and configured to transmit the rotational driving force from the clutch outer to a transmission shaft. The clutch discs are disposed between the clutch outer and the clutch inner and are movable in an axial direction of the transmission shaft so as to permit and cut off the transmission of the rotational driving force from the crankshaft to the transmission shaft. The first biasing mechanism is configured to apply a clamping force to the clutch discs. The cam mechanism is disposed inside the clutch outer and configured to adjust in accordance with the rotational driving force from the crankshaft the clamping force applied by the first biasing mechanism to the clutch discs. The second biasing mechanism is configured to generate a biasing force to separate the clutch discs away from one another and to weaken the clamping force applied by the first biasing mechanism to the clutch discs. The cam mechanism is configured to apply to the second biasing mechanism a force against the biasing force generated by the second biasing mechanism in accordance with the rotational driving force from the crankshaft.

According to another aspect of the present invention, a multi-plate clutch includes a clutch outer, a clutch inner, clutch discs, first biasing means, a cam mechanism, and second biasing means. A rotational driving force is configured to be transmitted from a crankshaft to the clutch outer. The clutch inner is disposed inside the clutch outer and configured to transmit the rotational driving force from the clutch outer to a transmission shaft. The clutch discs are disposed between the clutch outer and the clutch inner and are movable in an axial direction of the transmission shaft so as to permit and cut off the transmission of the rotational driving force from the crankshaft to the transmission shaft. The first biasing means applies a clamping force to the clutch discs. The cam mechanism is disposed inside the clutch outer and configured to adjust in accordance with the rotational driving force from the crankshaft the clamping force applied by the first biasing means to the clutch discs. The second biasing means generates a biasing force to separate the clutch discs away from one another to weaken the clamping force applied by the first biasing means to the clutch discs. The cam mechanism is configured to apply to the second biasing means a force against the biasing force generated by the second biasing means in accordance with the rotational driving force from the crankshaft.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENT

Figure 1:
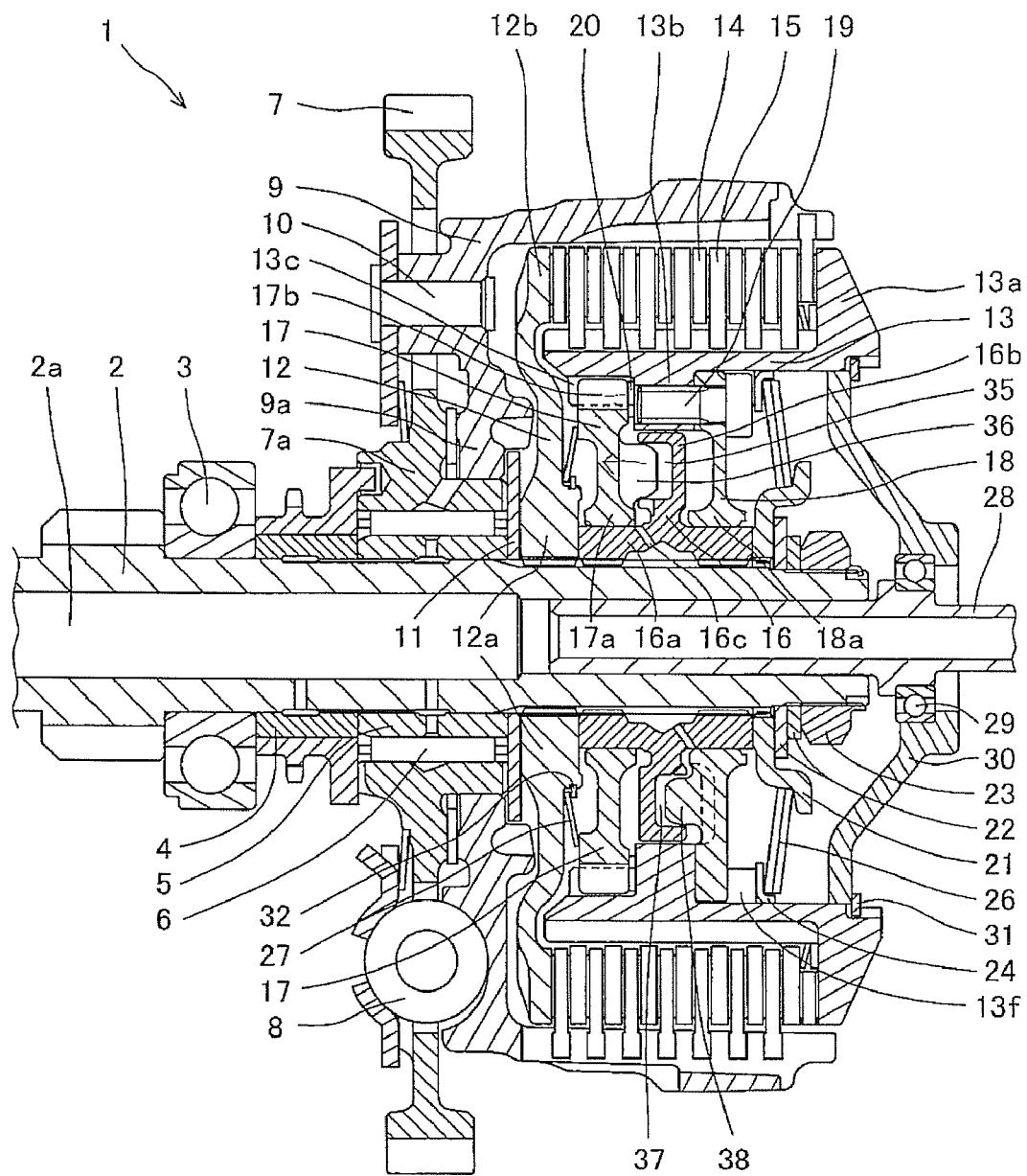
FIG. 1 is a vertical sectional view of a multi-plate clutch 1 according to an embodiment of the present invention.

Embodiments will now be described with reference to the accompanying drawings, wherein like reference numerals designate corresponding or identical elements throughout the various drawings.

FIG. 1 is a vertical sectional view of a multi-plate clutch 1 according to an embodiment of the present invention. The clutch is disposed in the course of the transmission route of the rotational force from a crankshaft of an internal combustion engine to a main shaft of a transmission in a vehicle, such as a motorcycle. The connection and the disconnection of the clutch are controlled in response to the gear-shifting operation performed by the rider. When the locations of members and the like are described with reference to FIG. 1, the right-hand side of the drawing is simply referred to as the "right-hand side," and the left-hand side of the drawing is simply referred to as the "left-hand side."

FIG. 1 shows that a transmission main shaft 2 is rotatably supported by an unillustrated crankcase with a ball bearing 3 set in between. A gear box (not illustrated) is disposed at the left-hand side of the ball bearing 3. At the right-hand side of the ball bearing 3, a sleeve 4 and a sleeve 5 are disposed on the transmission main shaft 2. The sleeve 4 is adjacent to the ball bearing 3 while the sleeve 5 is adjacent to the sleeve 4. A driven gear 7 is supported on a needle bearing 6 that is disposed on the outer circumference of the sleeve 5. The driven gear 7 is rotatably supported relatively to the transmission main shaft 2. The driven gear 7 constantly meshes with a drive gear disposed on the crankshaft. Damping members 8 are disposed between the main-body portion of the driven gear 7 and the peripheral teeth-portions of the driven gear 7. A boss portion 9a of a clutch outer 9 of the multi-plate clutch 1 is held on the outer circumference of a boss portion 7a of the driven gear 7. The clutch outer 9 is coupled to the driven gear 7 with rivets 10, so that the clutch outer 9 and the driven gear 7 rotate together.

A first clutch inner 12 is disposed inside the clutch outer 9 so as to be adjacent to the right-hand side of the boss portion 7a of the driven gear 7 with a ring-shaped spacer 11 placed in between. The first clutch inner 12 is supported with its boss portion 12a spline-fitted onto the transmission main shaft 2.

A second clutch inner 13 is also disposed inside the clutch outer 9 so as to be opposed to the first clutch inner 12. Plural driving clutch discs 14 engage with the clutch outer 9. The driving clutch discs 14 are not capable of rotating relatively to the clutch outer 9 but capable of moving in the axial direction. Plural driven clutch discs 15 engage with the second clutch inner 13. The driven clutch discs 15 are not capable of rotating relatively to the second clutch inner 13 but capable of moving in the axial direction. The driving clutch discs 14 and the driven clutch discs 15 are alternately placed. Among the group of plural clutch discs, the one located at the most left-hand side is in contact with the outer peripheral portion of the first clutch inner 12, so that the outer peripheral portion can be referred to as a pressure-receiving portion 12b. Among the group of plural clutch discs, the one located at the most right-hand side is in contact with the right-hand side end of the second clutch inner 13, so that the right-hand side end can be referred to as a pressurizing portion 13a.

A central-cam plate 16 is supported with its boss portion 16a spline-fitted onto the transmission main shaft 2. The boss portion 16a is adjacent to the boss portion 12a of the first clutch inner 12. The central-cam plate 16 includes an outwardly-extending portion 16b that extends outwards in the radial direction of the transmission main shaft 2. Both of the two sides of the outwardly-extending portion 16b are formed into cam mechanisms, respectively.

A boss portion 17a of an assist-cam plate 17 and a boss portion 18a of a slipper-cam plate 18 are fitted onto the outer circumference of the boss portion 16a of the central-cam plate 16. The boss portions 17a and 18a are capable of sliding on the boss portion 16a both in the axial direction and in the circumferential direction. Spline ridges 17b formed in the outer circumferential portion of the assist-cam plate 17 are fitted into internal spline grooves 13c formed in the inner circumferential portion of the second clutch inner 13. Accordingly, the spline ridge 17b is capable of sliding in the axial direction. An inward flange 13b is formed in the inner circumferential portion of the second clutch inner 13. The outer peripheral portion of the slipper-cam plate 18 is fixed to the inward flange 13b with bolts 19. The slipper-cam plate 18 and the second clutch inner 13 are integrated into a single united body, but the assist-cam plate 17 is formed, and is capable of moving, independently of the single united body. While the vehicle is not moving or travelling normally, the outer peripheral portion of the assist-cam plate 17 is in contact with the inward flange 13b of the second clutch inner 13 with a washer 20 placed in between. The assist-cam plate 17 is located at the left-hand side of the outwardly-extending portion 16b of the central-cam plate 16, and is capable of moving in the axial direction. The slipper-cam plate 18, which is integrated with the second clutch inner 13, is located at the right-hand side of the outwardly-extending portion 16b of the central-cam plate 16, and is capable of moving in the axial direction. In the above-described configuration, a cam mechanism is formed between one of the surfaces of the assist-cam plate 17 and the opposed surface of the outwardly-extending portion 16b of the central-cam plate 16. Likewise, a cam mechanism is formed between one of the surfaces of the slipper-cam plate 18 and the opposed surface of the outwardly-extending portion 16b of the central-cam plate 16. In the above-described configuration, the washer 20 disposed between the assist-cam plate 17 and the second clutch inner 13 reduces the wearing of the inward flange 13b and of the assist-cam plate 17, which would otherwise be caused by the axial movement of the assist-cam plate 17.

A spring-receiving member 21 is spline-fitted onto the transmission main shaft 2 so as to be adjacent to the boss portion 16a of the central-cam plate 16. A washer 22 is disposed so as to be adjacent to the spring-receiving member 21, and a nut 23 is disposed next to the washer 22. In this way, the first clutch inner 12, the central-cam plate 16, and the spring-receiving member 21 are fixed so as to be incapable of moving in the axial direction. A spring-receiving member 24 is fitted into the inner surface of the second clutch inner 13. Spring-receiving-member contact portions 13f are formed at three positions of the inner surface of the second clutch inner 13 so as to allow the spring-receiving member 24 to be in contact with the spring-receiving-member contact portions 13f. First biasing mechanism, that is, a first disc spring 26, is set between the spring-receiving member 21 disposed on the transmission main shaft 2 and the spring-receiving member 24 disposed in the second clutch inner 13. The first disc spring 26 pushes the second clutch inner 13 towards the first clutch inner 12, resulting in a "clamping force" that acts on the clutch discs 14 and 15.

Second basing mechanism, that is, a second disc spring 27, is set between the boss portion 12a of the first clutch inner 12 and the assist-cam plate 17. The biasing force of the second disc spring 27 is weaker than that of the first disc spring 26. The biasing force of the second disc spring 27 pushes the assist-cam plate 17 and the second clutch inner 13 that is in contact with the assist-cam plate 17 with the washer 20 placed in between. The assist-cam plate 17 and the second clutch inner 13 are pushed from the boss portion 12a of the first clutch inner 12 as the starting point so as to move away from the first clutch inner 12. To put it differently, the biasing force of the second disc spring 27 serves as the "force against the clamping force," that is, a force that weakens the clamping force exerted by the first disc spring 26 on the clutch discs 14 and 15. In the above-described configuration, a circlip 32 is disposed at the inner side of the second disc spring 27. Accordingly, even when the second disc spring 27 is pushed by the assist-cam plate 17, the circlip 32 prevents the second disc spring 27 from dropping off from the boss portion 12a of the first clutch inner 12. In addition, the prevention of the dropping is achieved without making the boss portion 12a larger in size in the axial direction.

The first disc spring 26 is stronger than the second disc spring 27. While the internal combustion engine is not running and the vehicle is traveling normally, the second clutch inner 13 is pushed towards the first clutch inner 12 as a result of the balance between the pushing forces of the two disc springs 26 and 27. Accordingly, the plural clutch discs 14 and 15 are clamped together between the pressurizing portion 13a of the second clutch inner 13 and the pressure-receiving portion 12b of the first clutch inner 12.

A central hole 2a is formed in the transmission main shaft 2, and an operation rod 28 is fitted into an end portion of the central hole 2a. An operation plate 30 is held on the outer circumferential portion of the operation rod 28 with a ball bearing 29 set in between. The outer circumference of the operation plate 30 engages with a circlip 31 that is fitted to the inner circumference of the second clutch inner 13. To disconnect the clutch that has been connected, the operation rod 28 is pulled towards the right-hand side of the clutch against the biasing force of the first disc spring 26. The second clutch inner 13 is moved outwards by the operation plate 30 so as to weaken the clamping force. As a consequence, the clutch discs 14 and 15 get separated from one another.

An assist-cam mechanism is formed between the central-cam plate 16 and the assist-cam plate 17, and is illustrated in the upper half of FIG. 1. The assist-cam mechanism includes recessed assist cams 35 formed in the central-cam plate 16 and raised assist cams 36 formed in the assist-cam plate 17.

A slipper-cam mechanism is formed between the central-cam plate 16 and the slipper-cam plate 18, and is illustrated in the lower half of FIG. 1. The slipper-cam mechanism includes recessed slipper cams 37 formed in the central-cam plate 16 and raised slipper cams 38 formed in the slipper-cam plate 18.

Oil holes 16c are formed in the boss portion 16a of the central-cam plate 16. Through these oil holes 16c, oil to lubricate the cam mechanisms is supplied from the central hole 2a of the transmission main shaft 2 to the space surrounded by the assist-cam plate 17, the central-cam plate 16, the slipper-cam plate 18, and the inward flange 13b of the second clutch inner 13.

Figure 2:
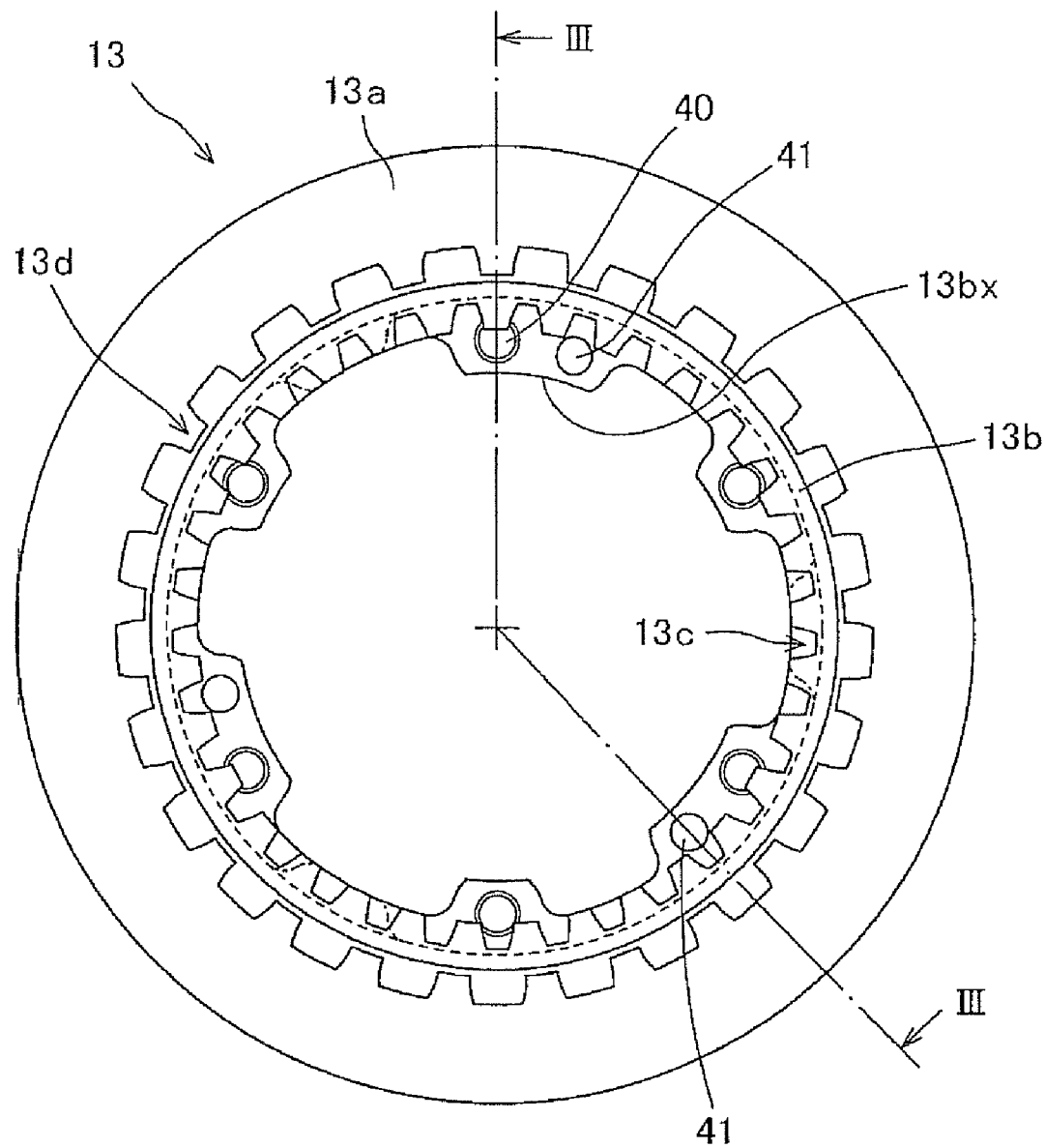
FIG. 2 is a left-hand side view of a second clutch inner 13.
Figure 3:
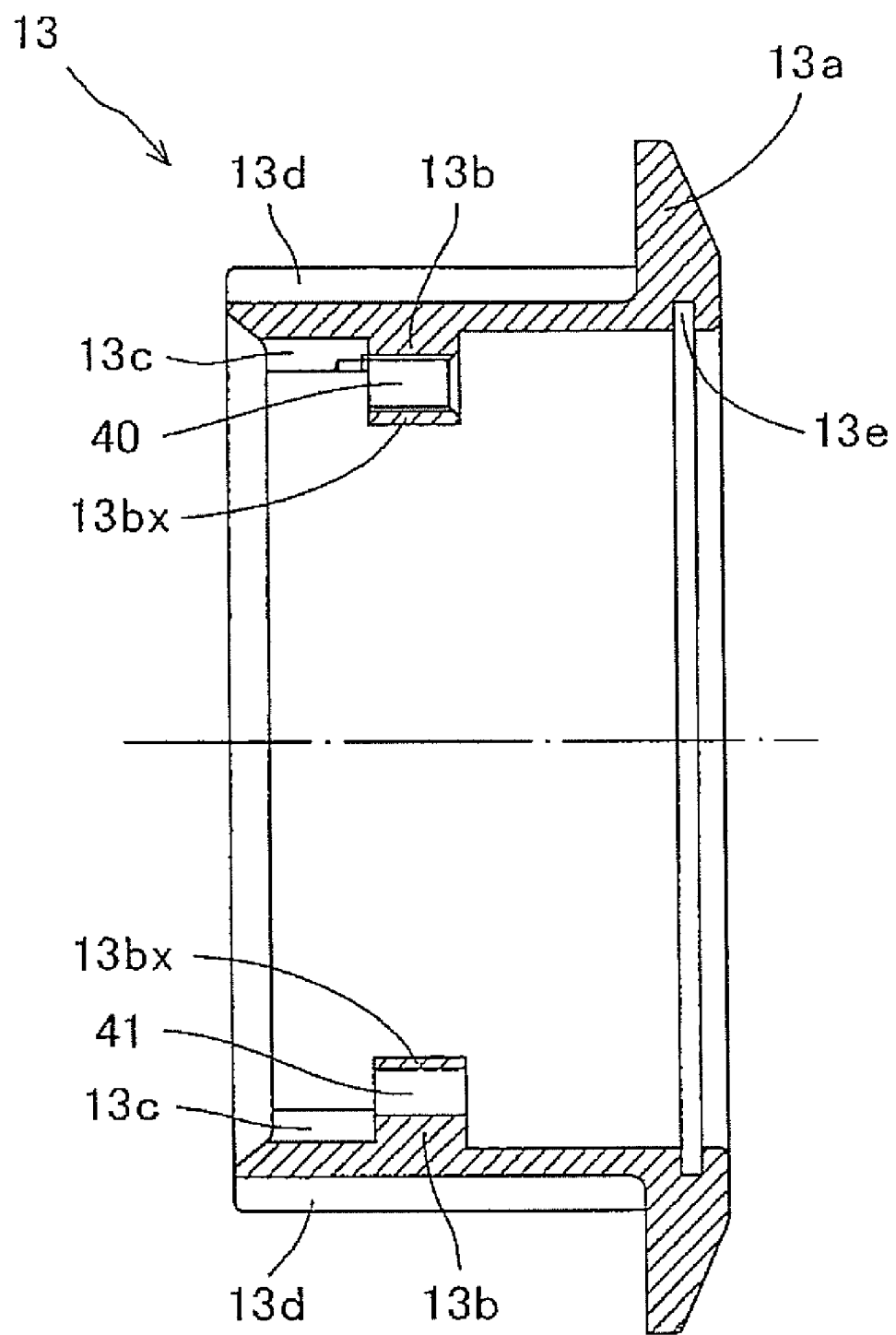
FIG. 3 is a sectional view taken along the line III-III of FIG. 2.

FIG. 2 is a left-hand side view of the second clutch inner 13. FIG. 3 is a sectional view taken along the line III-III of FIG. 2. The pressurizing portion 13a is formed on the right-hand side end of the second clutch inner 13. Protruding portions 13bx are formed in the inward flange 13b that is formed inside of the cylindrical portion of the second clutch inner 13. Bolt-screw-in threaded holes 40 are formed respectively in the protruding portions 13bx, and the bolts 19 illustrated in FIG. 1 are screwed respectively into the bolt-screw-in threaded holes 40. Some of the bolt-screw-in threaded holes 40 are accompanied respectively by ventilation holes 41 formed so as to be adjacent to the corresponding bolt-screw-in threaded holes 40. The internal spline grooves 13c are formed in the inner side of the left-hand side end of the cylindrical portion. The spline ridges 17b formed in the assist-cam plate 17 engage with the internal spline grooves 13c. External spline grooves 13d are formed in the outer side of the cylindrical portion. The driven clutch discs 15 engage with the external spline grooves 13d. Accordingly, the driven clutch discs 15 are not capable of rotating relatively to the second clutch inner 13 but capable of moving in the axial direction. A circlip-fitting groove 13e to which the circlip 31 is fitted is formed in the inner side of the pressurizing portion 13a located at the right-hand side of the second clutch inner 13.

Figure 4:
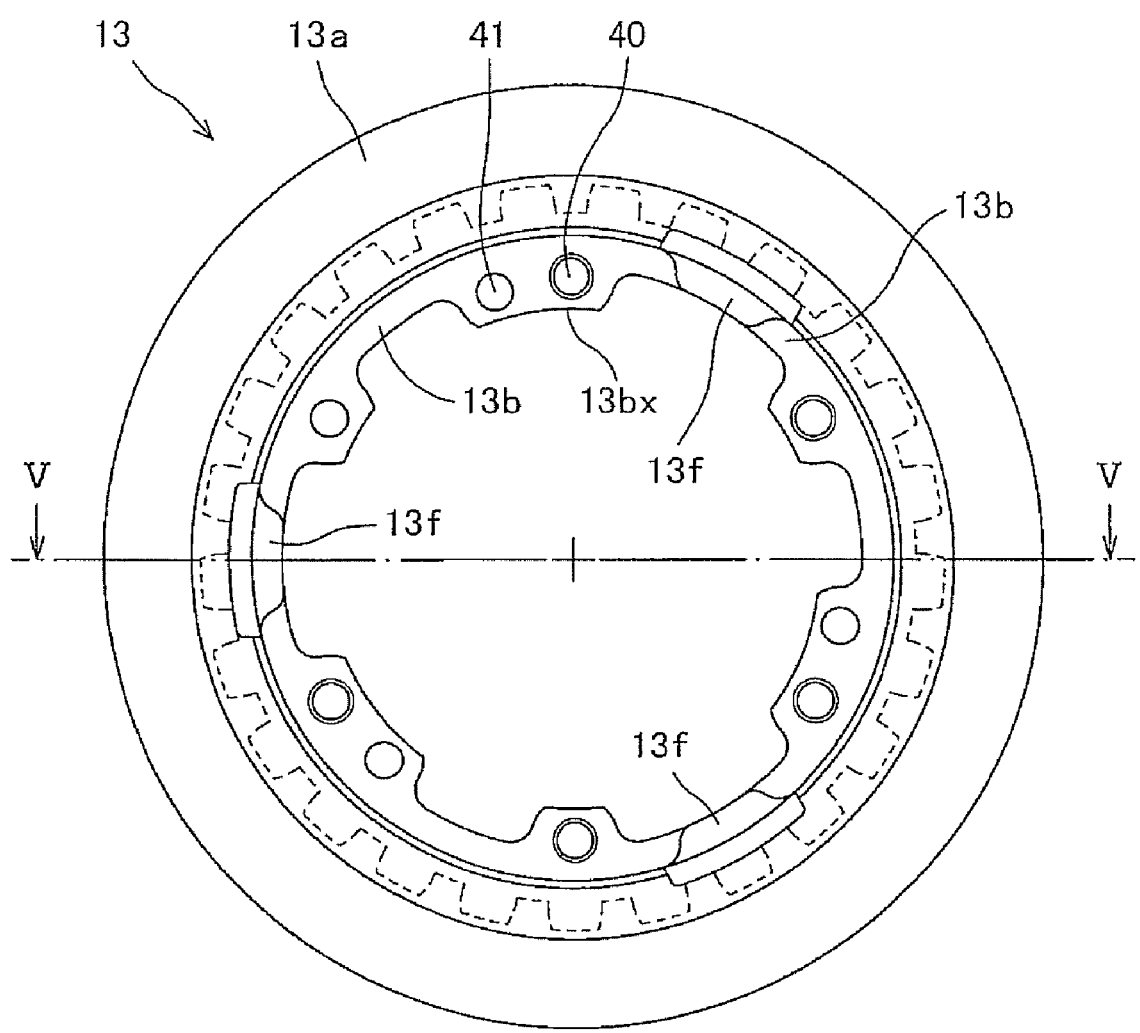
FIG. 4 is a right-hand side view of the second clutch inner 13.
Figure 5:
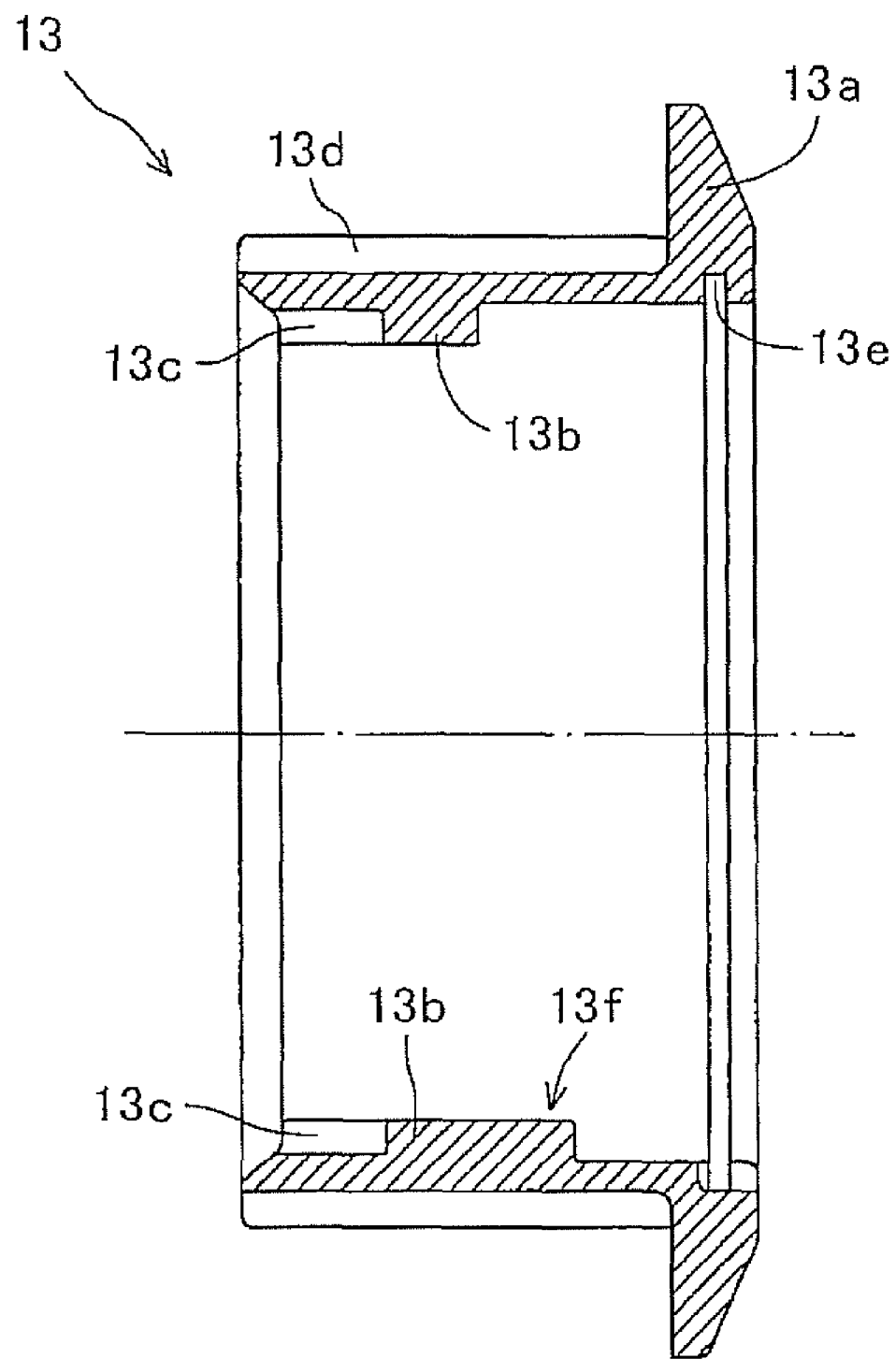
FIG. 5 is a sectional view taken along the line V-V of FIG. 4.

FIG. 4 is a right-hand side view of the second clutch inner 13. FIG. 5 is a sectional view taken along the line V-V of FIG. 4. The spring-receiving-member contact portions 13f illustrated in FIG. 1 are formed at three positions in the inner side of the cylindrical portion of the second clutch inner 13. The spring-receiving-member contact portions 13f are formed by extending corresponding parts of the inward flange 13b towards the right-hand side.

Figure 6:
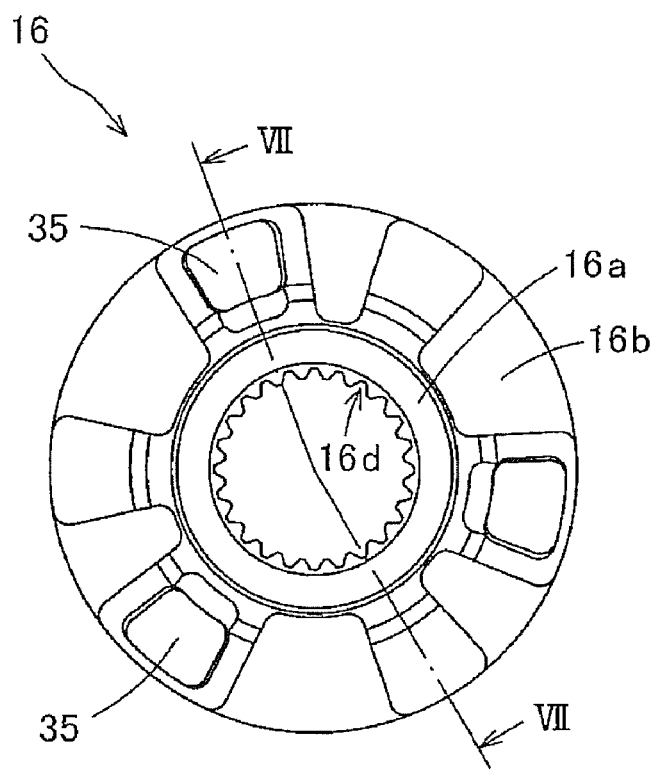
FIG. 6 is a left-hand side view of a central-cam plate 16.
Figure 7:
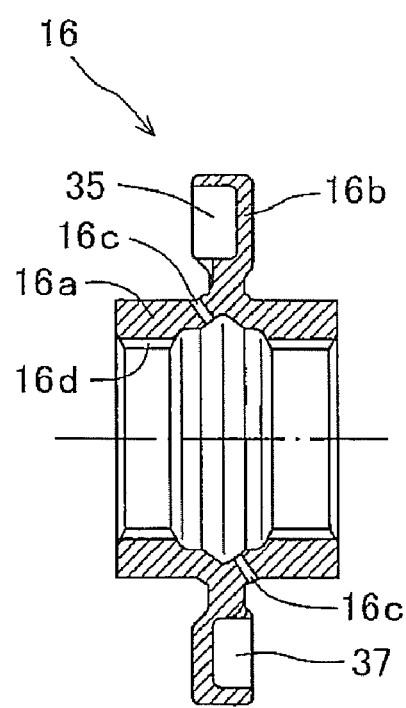
FIG. 7 is a sectional view taken along the line VII-VII of FIG. 6.
Figure 8:
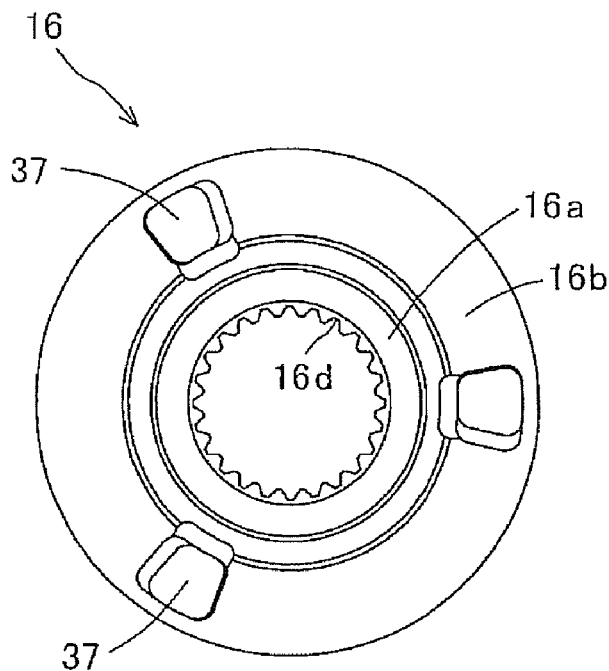
FIG. 8 is a right-hand side view of the central-cam plate 16.

FIG. 6 is a left-hand side view of the central-cam plate 16. FIG. 7 is a sectional view taken along the line VII-VII of FIG. 6. FIG. 8 is a right-hand side view of the central-cam plate 16. The central-cam plate 16 includes the boss portion 16a and the outwardly-extending portion 16b, which extends outwards in the radial direction from the boss portion 16a. Splines 16d are formed in the inner side of the boss portion 16a. Accordingly, the central-cam plate 16 is fitted onto the transmission main shaft 2 so as to be incapable of rotating relatively to the transmission main shaft 2. The recessed assist cams 35 are formed at three positions in the left-hand side surface of the outwardly-extending portion 16b while the recessed slipper cams 37 are formed at three positions in the right-hand side surface of the outwardly-extending portion 16b. This means that the central-cam plate 16 is a member with the recessed cams 35 and 37 formed in both side surfaces thereof. The oil holes 16c to lubricate the above-described cam portions are formed in the boss portion 16a.

Figure 9:
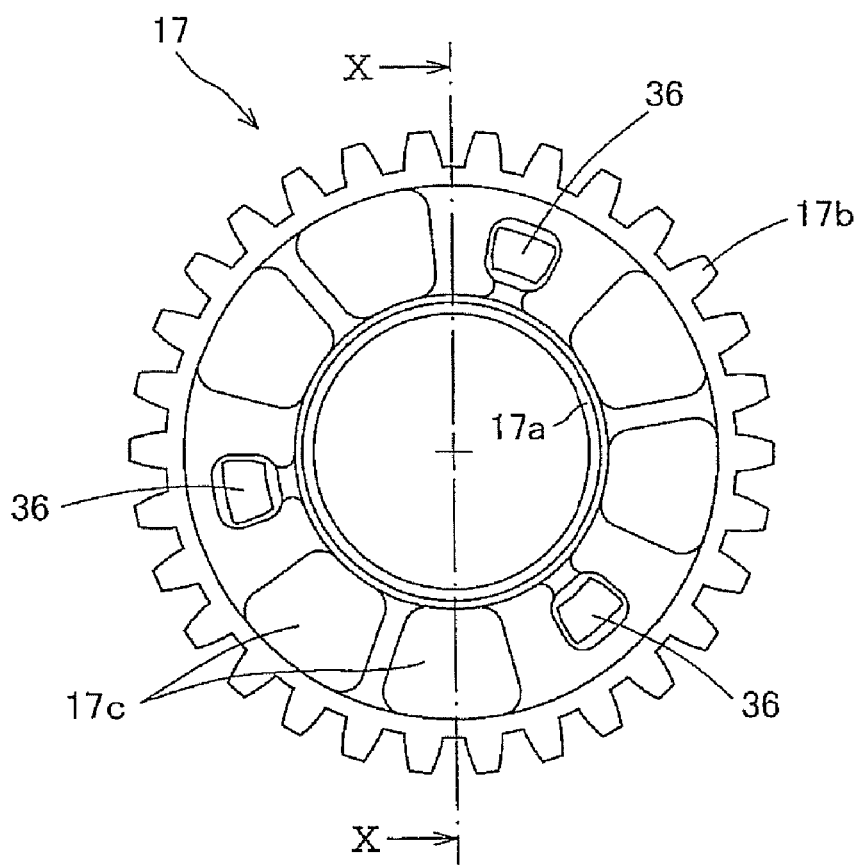
FIG. 9 is a right-hand side view of an assist-cam plate 17.
Figure 10:
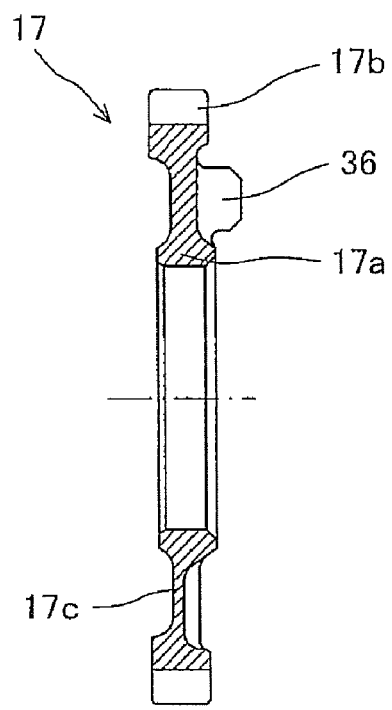
FIG. 10 is a sectional view taken along the line X-X of FIG. 9.

FIG. 9 is a right-hand side view of the assist-cam plate 17. FIG. 10 is a sectional view taken along the line X-X of FIG. 9. Since the assist-cam plate 17 needs to slide on the outer circumference of the boss portion 16a of the central-cam plate 16, the inner surface of the boss portion 17a of the assist-cam plate 17 is a smooth surface. The spline ridges 17b are formed in the outer circumferential portion of the assist-cam plate 17, and engage with the internal spline grooves 13c of the second clutch inner 13. The raised assist cams 36 are formed on the right-hand side surface of the assist-cam plate 17. Thin-wall portions 17c are formed in portions located between every two adjacent raised assist cams 36 so that the assist-cam plate 17 can be lighter in weight (see FIG. 9).

Figure 11:
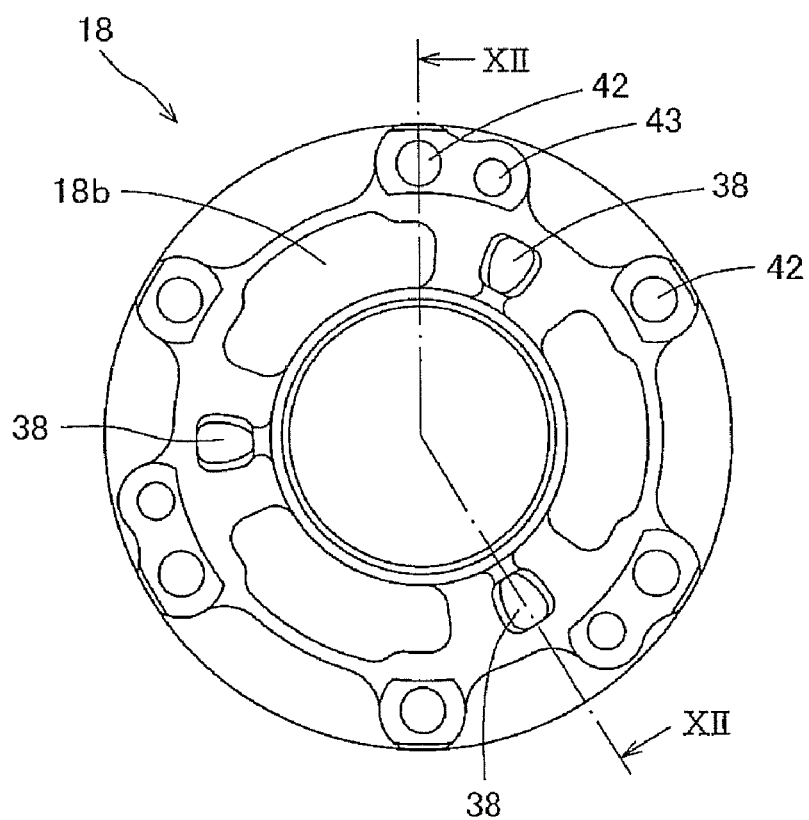
FIG. 11 is a left-hand side view of a slipper-cam plate 18.
Figure 12:
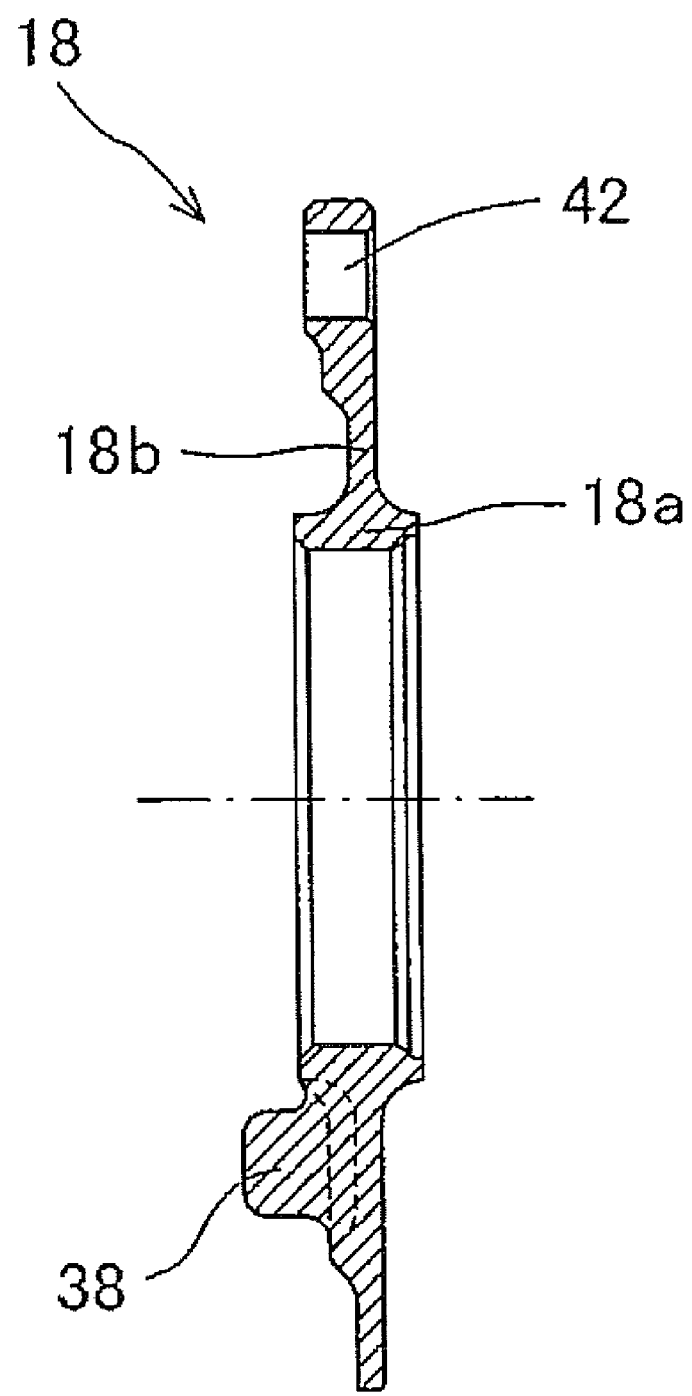
FIG. 12 is a sectional view taken along the line XII-XII of FIG. 11.

FIG. 11 is a left-hand side view of the slipper-cam plate 18. FIG. 12 is a sectional view taken along the line XII-XII of FIG. 11. Since the slipper-cam plate 18 needs to slide on the outer circumference of the boss portion 16a of the central-cam plate 16, the inner surface of the boss portion 18a of the slipper-cam plate 18 is a smooth surface. Bolt-insertion holes 42 and ventilation holes 43 are formed in the outer peripheral portion of the slipper-cam plate 18. The slipper-cam plate 18 is attached to the inward flange 13b of the second clutch inner 13 by inserting the bolts 19 (see FIG. 1) respectively into the bolt-insertion holes 42. The raised slipper cams 38 are formed on the left-hand side surface of the slipper-cam plate 18. Thin-wall portions 18b are formed in portions located between every two adjacent raised slipper cams 38 so that the slipper-cam plate 18 can be lighter in weight (see FIG. 11).

Figure 13:
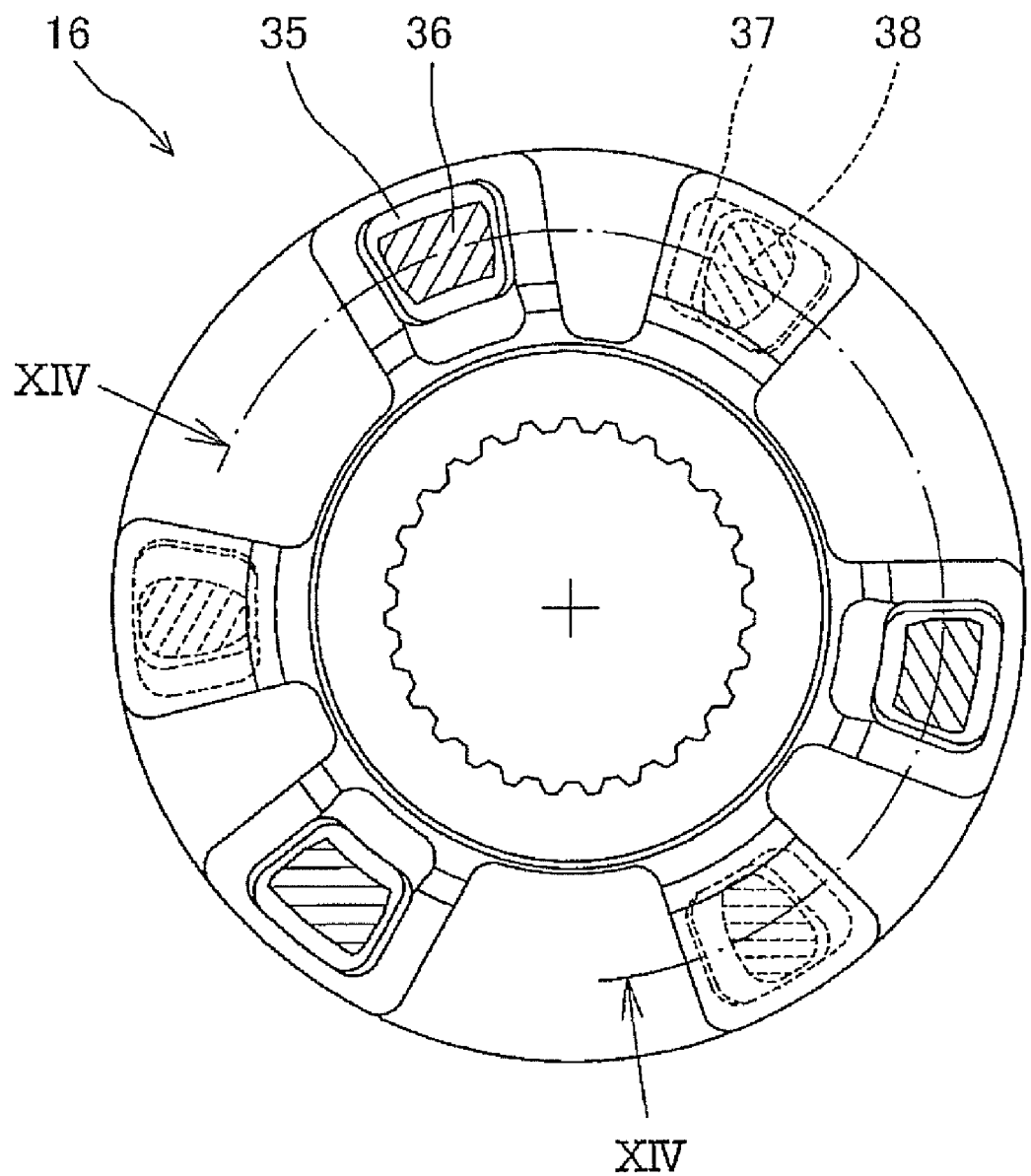
FIG. 13 is an enlarged left-hand side view of the central-cam plate 16.

FIG. 13 is an enlarged left-hand side view of the central-cam plate 16, that is, an enlarged view illustrating the surface in which the recessed assist cams 35 are formed (FIG. 6). FIG. 13 also illustrates the cross-sectional shapes of the raised assist cams 36 that engage with the recessed assist cams 35. In addition, FIG. 13 illustrates, by means of broken lines, the recessed slipper cams 37 formed in the opposite surface of the central-cam plate 16 and also illustrates the raised slipper cams 38 that engage respectively with the recessed slipper cams 37.

Figure 14:
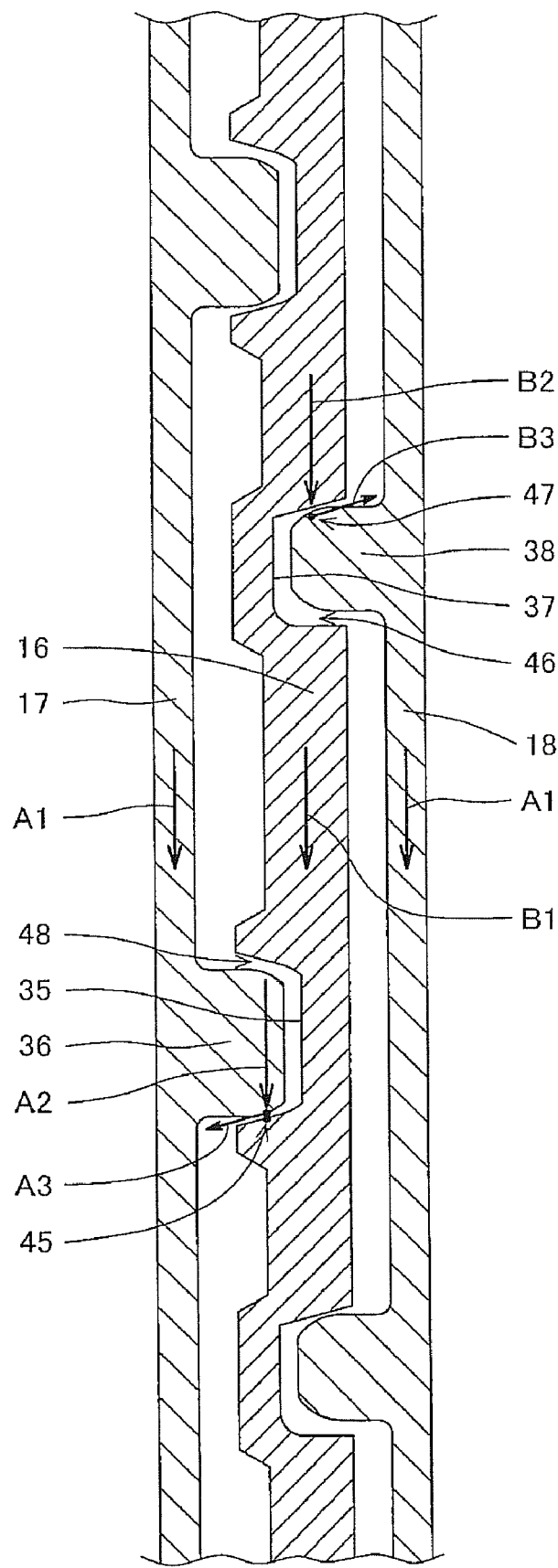
FIG. 14 is a developed sectional view taken along the line XIV-XIV of FIG. 13.

FIG. 14 is a developed sectional view taken along the line XIV-XIV of FIG. 13. The assist-cam plate 17 and the slipper-cam plate 18 located respectively at the two sides of the central-cam plate 16 are capable of moving by a small amount, independently of and relatively to each other, both in the up-and-down direction and in the right-and-left direction in the drawing with respect to the central-cam plate 16.

Now, refer to FIG. 1. While the internal combustion engine is not running, the first disc spring 26 pushes the second clutch inner 13. Accordingly, the driving clutch discs 14 and the driven clutch discs 15 are clamped together between the pressurizing portion 13a of the second clutch inner 13 and the pressure-receiving portion 12b of the first clutch inner 12. Once the driving torque transmitted from the internal combustion engine is inputted into the multi-plate clutch 1 via the driven gear 7, the clutch outer 9 starts rotating. The rotation of the clutch outer 9 rotates the driving clutch discs 14 that engage with the clutch outer 9. The rotation of the driving clutch discs 14 rotates the driven clutch discs 15 that are clamped together with the driving clutch discs 14. The rotation of the driven clutch discs 15 rotates the second clutch inner 13 that engages with the driven clutch discs 15. The rotation of the second clutch inner 13 rotates the assist-cam plate 17 that engages with the second clutch inner 13 by means of the splines 13c and 17b. The rotation of the second clutch inner 13 rotates the slipper-cam plate 18 that is fastened to the second clutch inner 13 with the bolts 19.

Now, refer back to FIG. 14. Once the series of rotations start, a driving torque A1 acts on the rotating assist-cam plate 17 and on the rotating slipper-cam plate 18. The raised assist cams 36 that are formed on the assist-cam plate 17 move in the same direction as the direction of the driving torque A1. Each of the raised assist cams 36 is, then, brought into contact with an opposing point 45 that is located on the sloping face of the corresponding recessed assist cam formed in the central-cam plate 16. The raised assist cams 36 push the central-cam plate 16 with a pushing force A2 that is equivalent to the driving torque A1, so that the driving torque A1 is transmitted to the central-cam plate 16. Consequently, the central-cam plate 16 is also driven by the driving torque A1. This driving torque A1 is then transmitted to the transmission main shaft 2 that is spline-fitted into the central-cam plate 16. The driving torque from the internal combustion engine is transmitted to the transmission main shaft 2 also by way of the first clutch inner 12 that is spline-fitted onto the transmission main shaft 2 (see FIG. 1). As a consequence, the transmission main shaft 2 is rotated.

The driving torque A1 acts also on the slipper-cam plate 18, and the slipper cam plate 18 rotates together with the assist-cam plate 17. No torque is, however, transmitted from the slipper-cam plate 18 to the central-cam plate 16. This is because a clearance 46 is formed in the rotational direction between each of the raised slipper cams 38 and the corresponding recessed slipper cam 37. What has been described thus far is the mechanism by which the multi-plate clutch 1 transmits the driving force while the vehicle is travelling normally.

The increase in the driving torque A1 that is transmitted from the internal combustion engine and inputted into the multi-plate clutch 1 via the driven gear 7 is accompanied by the parallel increase in the pushing force A2 exerted by each raised assist cam 36 on the opposing point 45 on the corresponding recessed assist cam 35. In this event, the sloping-face-direction component of the pushing force A2 (such a component is denoted by A3 in FIG. 14) pushes the raised assist cam 36 in the sloping-face direction, so that the assist-cam plate 17 moves, along the sloping faces, in the direction of the component A3. To put it differently, while moving by a small amount in the rotational direction with respective to the central-cam plate 16, the assist-cam plate 17 moves away from the central-cam plate 16.

In this event, the assist-cam plate 17 that is in contact with the second clutch inner 13 with the washer 20 set in between (see FIG. 1) moves away from the second clutch inner 13 against the biasing force of the second disc spring 27. The second clutch inner 13 is, however, pushed leftwards by the first disc spring 26, so that the second clutch inner 13 moves in the same direction as the direction of the movement of the assist-cam plate 17. Accordingly, while the second clutch inner 13 is moving, the second clutch inner 13 keeps its contact with the assist-cam plate 17. The "force against the clamping force," that is, the pushing force of the second disc spring 27 is reduced, by a certain amount, by the assist cams 35 and 36 from the state where the pushing force of the first disc spring 26 is balanced with the pushing force of the second disc spring 27. The sum of the pushing forces that act on the second clutch inner 13 increases by the above-mentioned certain amount, so that the clamping force to clamp the clutch discs 14 and 15 between the pressurizing portion 13a and the pressure-receiving portion 12b increases as well. In summary, in accordance with the magnitude of the driving torque A1 from the internal combustion engine, the assist-cam plate 17 moves in the sloping-face direction of the recessed assist cams 35, so that the biasing force of the first disc spring 26 can give larger influence than otherwise. Accordingly, the clamping force for the clutch discs 14 and 15 is assisted, and thus the driving torque thus increased is transmitted. The second clutch inner 13 is pushed leftwards by the first disc spring 26, but pushes many clutch discs 14 and 15. Accordingly, the movement of the second clutch inner 13 is restricted to a certain distance. For this reason, the assist-cam plate 17 that has been in contact with the inward flange 13b of the second clutch inner 13 with the washer 20 set in between eventually departs from the inward flange 13b. The clamping force, however, continues to increase along with the increase in the driving torque A1 until the assist-cam plate 17 departs from the second clutch inner 13.

A further increase in the driving torque A1 that is transmitted from the internal combustion engine and inputted into the multi-plate clutch 1 via the driven gear 7 brings about a further increase in the pushing force A2 exerted by each raised assist cam 36 on the opposing point 45 of the corresponding recessed assist cam 35. Since the sloping-face-direction component A3 of the pushing force A2 increases, the raised assist cams 36 are pushed further in the sloping-face direction. As a consequence, the assist-cam plate 17 departs from the inward flange 13b of the second clutch inner 13. In this event, the position at which each raised assist cam 36 pushes the corresponding recessed assist cam 35 is shifted leftwards along the sloping face, but the raised assist cam 36 will not depart from the recessed assist cam 35.

Although the assist-cam plate 17 is in contact with the inward flange 13b of the second clutch inner 13 in FIG. 1 with the washer 20 set in between, the assist-cam plate 17 is separated away from the inward flange 13b of the second clutch inner 13 in the above-described state. Without the "force against the clamping force" exerted by the second disc spring 27, the biasing force of the first disc spring 26 becomes the only pushing force that acts on the second clutch inner 13. Accordingly, the maximum value of the biasing force of the first disc spring 26 is given as the clamping force for the clutch discs 14 and 15. Note that the clamping force for the clutch discs 14 and 15 cannot exceeds the maximum value of the biasing force of the first disc spring 26. Accordingly, the clamping force for the clutch discs 14 and 15 becomes constant at the maximum value of the biasing force of the first disc spring 26. This means that the cam mechanism assists the clamping force only within a predetermined value. Thus, it is no longer necessary for the component parts of the clutch to have an unnecessarily high stiffness. As a consequence, an unnecessary increase in the weight and the size of the clutch can be avoided.

Next, the influence of the back torque will be described. The arrow B1 in FIG. 14 indicates the direction of the back torque transmitted from the wheel via the transmission main shaft 2. Suppose a case where the vehicle that is travelling starts to decelerate and the deceleration makes the back torque B1 exceed the driving torque A1. In this case, the recessed slipper cams 37 move in the same direction as the direction of the back torque B1 with respect to the corresponding raised slipper cams 38. One of the sloping faces of each recessed slipper cam 37 is then brought into contact with an opposing point 47 of the corresponding raised slipper cam 38. The recessed slipper cams 37 thus push the slipper-cam plate 18 via the corresponding raised slipper cams 38 with a pushing force B2 that is equivalent to the above-mentioned back torque B1.

Suppose a case where the increase in the back torque B1 causes a parallel increase in the pushing force B2 exerted by the sloping face of each recessed slipper cam 37 on the opposing point 47 of the corresponding raised slipper cam 38. In this case, the sloping-face-direction component of the reaction force to the pushing force B2 (such a component is denoted by B3 in FIG. 14) moves the slipper-cam plate 18 along the sloping face in the direction of the reaction-force component B3. The movement is transmitted to the second clutch inner 13 that is fastened to the slipper-cam plate 18 with the bolts 19 to form a single united body, and pushes the pressurizing portion 13a of the second clutch inner 13 so as to separate the clutch discs 14 and 15 away from one another. In this event, the assist-cam plate 17 located at the opposite side of the central-cam plate 16 from the slipper-cam plate 18 is rotating together with the slipper-cam plate 18, but no torque is transmitted from the central-cam plate 16 to the assist-cam plate 17. This is because a clearance 48 is formed in the rotational direction between each of the recessed assist cams 35 and the corresponding raised assist cam 36. To put it differently, the assist-cam plate 17 is made to follow, by the biasing force of the second disc spring 27, the slipper-cam plate 18 that moves in the axial direction. In summary, when the back torque B1 from the transmission main shaft 2 exceeds the driving torque A1, the slipper-cam plate 18 moves rightwards. The rightward movement of the slipper-cam plate 18 reduces the clamping force exerted by the pressurizing portion 13a of the second clutch inner 13 on the clutch discs 14 and 15. Accordingly, the clutch discs 14 and 15 are allowed to slide. In this way, the slipper-cam mechanism reduces the transmission of the torque, and functions as a back-torque limiter. The slipper-cam mechanism alleviates the reverse-input torque at the time of deceleration, and softens the engine braking. Accordingly, the load on the drive train is reduced, and the tires become more wear-resistant.

As has been described thus far, the following effects can be obtained according to the embodiment of the present invention.

(1) The thrust generated in the assist cam serves the sole purpose of cancelling the "force against the clamping force" exerted by the second disc spring 27 on the clutch discs 14 and 15. Accordingly, the clamping force for the clutch discs 14 and 15 can never exceed the maximum value of the biasing force of the first disc spring 26. For this reason, the stiffness of each of the component parts of the clutch can be lowered down, so that the increase in the weight and the size of the clutch can be avoided.

(2) The second disc spring 27 is in contact with the assist-cam plate 17 so as to push the assist-cam plate 17 towards the central-cam plate 16. Accordingly, the position of the contact surfaces between the cams of the central-cam plate 16 and the corresponding cams of the assist-cam plate 17 can be stabilized. In addition, a force against the biasing force of the second disc spring 27 is exerted on the second disc spring 27 by means of the cam mechanism, so that the number of parts can be reduced and the multi-plate clutch can be smaller in size.

(3) The assist-cam plate 17 is spline-fitted into the second clutch inner 13 by means of the splines 13c and 17b. Accordingly, no special member is necessary when the assist-cam plate 17 is coupled to the second clutch inner 13 so as to be capable of moving in the axial direction. As a consequence, the number of parts can be reduced and the multi-plate clutch can be smaller in size.

(4) The assist-cam plate 17 to assist the clamping force and the slipper-cam plate 18 to reduce the back torque are disposed respectively at the two sides of the central-cam plate 16. Accordingly, while the cam mechanism has functions of assisting the clamping force and of reducing the back torque, the multi-plate clutch can be made compact.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A multi-plate clutch comprising:
   a clutch outer to which a rotational driving force is configured to be transmitted from a crankshaft;
   a clutch inner disposed inside the clutch outer and configured to transmit the rotational driving force from the clutch outer to a transmission shaft;
   clutch discs disposed between the clutch outer and the clutch inner and being movable in an axial direction of the transmission shaft so as to permit and cut off the transmission of the rotational driving force from the crankshaft to the transmission shaft;
   a first biasing mechanism configured to apply a clamping force to the clutch discs;
   a cam mechanism disposed inside the clutch outer and configured to adjust in accordance with the rotational driving force from the crankshaft the clamping force applied by the first biasing mechanism to the clutch discs; and
   a second biasing mechanism configured to generate a biasing force to separate the clutch discs away from one another and to weaken the clamping force applied by the first biasing mechanism to the clutch discs, the cam mechanism being configured to apply to the second biasing mechanism a force against the biasing force generated by the second biasing mechanism in accordance with the rotational driving force from the crankshaft,
   wherein the second biasing mechanism is a disc spring having an opening on an inner side that is mounted on the clutch inner and an outer side that is in contact with a side of the cam mechanism, and wherein the clutch inner has a radially protruding member that is in direct contact with and holds the inner side of the disc spring on the clutch inner and holds the inner side of the disc spring directly against a radially extending portion of the clutch inner,
   wherein the cam mechanism comprises:
   a central-cam plate disposed on the transmission shaft not to be relatively rotatable with respect to the transmission shaft and not to be movable in the axial direction, the central-cam plate comprising a boss portion and an extending portion extending outwards in a radial direction of the central-cam plate;

an assist-cam plate disposed on the boss portion of the central-cam plate to be movable in the axial direction of the transmission shaft; and a slipper-cam plate disposed on the boss portion of the central-cam plate, and disposed so that the extending portion of the central-cam plate is positioned between the slipper-cam plate and the assist-cam plate, wherein the clutch inner comprises:
- a first clutch inner disposed on the transmission shaft not to be relatively rotatable with respect to the transmission shaft and not to be movable in the axial direction and having a pressure-receiving portion to press the clutch discs; and
- a second clutch inner which engages with the clutch discs and which has a pressurizing portion to push the clutch discs in the axial direction together with the pressure-receiving portion of the first clutch inner, the second clutch inner being movable in the axial direction of the transmission shaft to clamp the clutch discs together and to separate the clutch discs away from one another, wherein the slipper-cam plate is bolted to the second clutch inner so as to not be capable of moving in the axial direction with respect to the second clutch inner, and wherein the assist-cam plate is spline-fitted into the second clutch inner so as to be capable of moving in the axial direction of the transmission shaft with respect to the second clutch inner and with respect to the slipper-cam plate.

2. The multi-plate clutch according to claim 1, wherein the first biasing mechanism has a stronger biasing force than the second biasing mechanism.

3. The multi-plate clutch according to claim 1, wherein the second biasing mechanism is configured such that a total clamping force applied for the clutch discs cannot exceed a maximum value of the biasing force of the first biasing mechanism.

4. The multi-plate clutch according to claim 1, wherein the slipper-cam plate is capable of moving in the axial direction with respect to the central-cam plate.

5. The multi-plate clutch according to claim 1, wherein the assist-cam plate is capable of axially sliding to a position in direct contact with the first clutch inner.

6. The multi-plate clutch according to claim 1,
wherein the central-cam plate further comprises first cam portions having concave and convex portions provided in first and second surfaces of the extending portion,
wherein the assist-cam plate further comprises second cam portions provided in a surface facing the extending portion, the second cam portions having concave and convex portions provided to be fitted to the convex and concave portions provided in the central-cam plate,
wherein the second biasing mechanism is disposed so that the assist-cam plate is positioned between the second biasing mechanism and the central-cam plate, the second biasing mechanism is in contact with the assist-cam plate, and the second biasing mechanism is configured to apply the biasing force via the assist-cam plate to separate the clutch discs away from one another, and
wherein the assist-cam plate climbs the first cam portions of the central-cam plate in accordance with the rotational driving force from the crankshaft to move in a direction along which the first biasing mechanism is configured to apply the clamping force to the clutch discs.

7. The multi-plate clutch according to claim 6
wherein the slipper-cam plate has cam portions provided in a surface of the slipper cam plate facing the extending portion of the central-cam plate, and the cam portions each has one of concave and convex cam portions that is fitted to the one of concave and convex cam portions provided in the central-cam plate, and
wherein when a load from the transmission shaft exceeds a predetermined value, the slipper-cam plate is configured to climb the cam portions of the central-cam plate to move in a direction opposite to a biasing direction along which the first biasing mechanism is configured to apply the clamping force so as to reduce the clamping force applied by the first biasing mechanism.

8. A multi-plate clutch comprising:
a clutch outer to which a rotational driving force is configured to be transmitted from a crankshaft;
a clutch inner disposed inside the clutch outer and configured to transmit the rotational driving force from the clutch outer to a transmission shaft;
clutch discs disposed between the clutch outer and the clutch inner and being movable in an axial direction of the transmission shaft so as to permit and cut off the transmission of the rotational driving force from the crankshaft to the transmission shaft;
first biasing means for applying a clamping force to the clutch discs;
a cam mechanism disposed inside the clutch outer and configured to adjust in accordance with the rotational driving force from the crankshaft the clamping force applied by the first biasing means to the clutch discs; and
second biasing means for generating a biasing force to separate the clutch discs away from one another to weaken the clamping force applied by the first biasing means to the clutch discs, the cam mechanism being configured to apply to the second biasing means a force against the biasing force generated by the second biasing means in accordance with the rotational driving force from the crankshaft,
wherein the second biasing means is a disc spring having an opening on an inner side that is mounted on the clutch inner and an outer side that is in contact with a side of the cam mechanism, and wherein the clutch inner has a radially protruding member that is in direct contact with and holds the inner side of the disc spring on the clutch inner and holds the inner side of the disc spring directly against a radially extending portion of the clutch inner,
wherein the cam mechanism comprises:
a central-cam plate disposed on the transmission shaft not to be relatively rotatable with respect to the transmission shaft and not to be movable in the axial direction, the central-cam plate comprising a boss portion and an extending portion extending outwards in a radial direction of the central-cam plate;
an assist-cam plate disposed on the boss portion of the central-cam plate to be movable in the axial direction of the transmission shaft; and
a slipper-cam plate disposed on the boss portion of the central-cam plate, and disposed so that the extending portion of the central-cam plate is positioned between the slipper-cam plate and the assist-cam plate,
wherein the clutch inner comprises:
a first clutch inner disposed on the transmission shaft not to be relatively rotatable with respect to the transmission shaft and not to be movable in the axial direction and having a pressure-receiving portion to press the clutch discs; and a second clutch inner which engages with the clutch discs and which has a pressurizing portion to push the clutch discs in the axial direction together with the pressure-receiving portion of the first clutch inner, the second clutch inner being movable in the axial direction of the transmission shaft to clamp the clutch discs together and to separate the clutch discs away from one another, wherein the slipper-cam plate is bolted to the second clutch inner so as to not be capable of moving in the axial direction with respect to the second clutch inner, and wherein the assist-cam plate is spline-fitted into the second clutch inner so as to be capable of moving in the axial direction of the transmission shaft with respect to the second clutch inner and with respect to the slipper-cam plate.

9. The multi-plate clutch according to claim 8, wherein the first biasing means has a stronger biasing force than the second biasing means.

10. The multi-plate clutch according to claim 8, wherein the second biasing means is configured such that a total clamping force applied for the clutch discs cannot exceed a maximum value of the biasing force of the first biasing means.

11. The multi-plate clutch according to claim 8, wherein the slipper-cam plate is capable of moving in the axial direction with respect to the central-cam plate.

12. The multi-plate clutch according to claim 8, wherein the assist-cam plate is capable of axially sliding to a position in direct contact with the first clutch inner.

13. The multi-plate clutch according to claim 8,
wherein the central-cam plate further comprises first cam portions having concave and convex portions provided in first and second surfaces of the extending portion, and wherein the assist-cam plate further comprises second cam portions provided in a surface facing the extending portion, the second cam portions having concave and convex portions provided to be fitted to the convex and concave portions provided in the central-cam plate, wherein the second biasing means is disposed so that the assist-cam plate is positioned between the second biasing means and the central-cam plate, the second biasing means is in contact with the assist-cam plate, and the second biasing means is configured to apply the biasing force via the assist-cam plate to separate the clutch discs away from one another, and wherein the assist-cam plate climbs the first cam portions of the central-cam plate in accordance with the rotational driving force from the crankshaft to move in a direction along which the first biasing means is configured to apply the clamping force to the clutch discs.

14. The multi-plate clutch according to claim 13
wherein the slipper-cam plate has cam portions provided in a surface of the slipper cam plate facing the extending portion of the central-cam plate, and the cam portions each has one of concave and convex cam portions that is fitted to the one of concave and convex cam portions provided in the central-cam plate, and wherein when a load from the transmission shaft exceeds a predetermined value, the slipper-cam plate is configured to climb the cam portions of the central-cam plate to move in a direction opposite to a biasing direction along which the first biasing means is configured to apply the clamping force so as to reduce the clamping force applied by the first biasing means.

* * * * *